April 28, 1936.     F. J. WILSON     2,038,867
JOINT
Filed Aug. 19, 1935
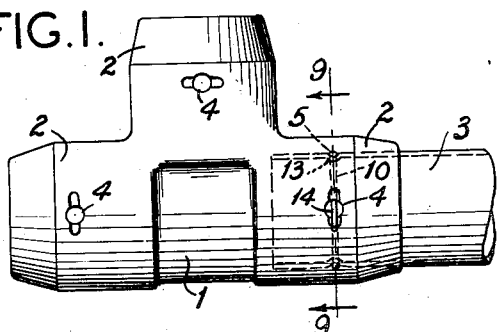
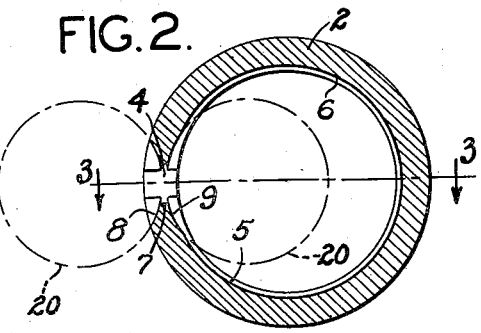
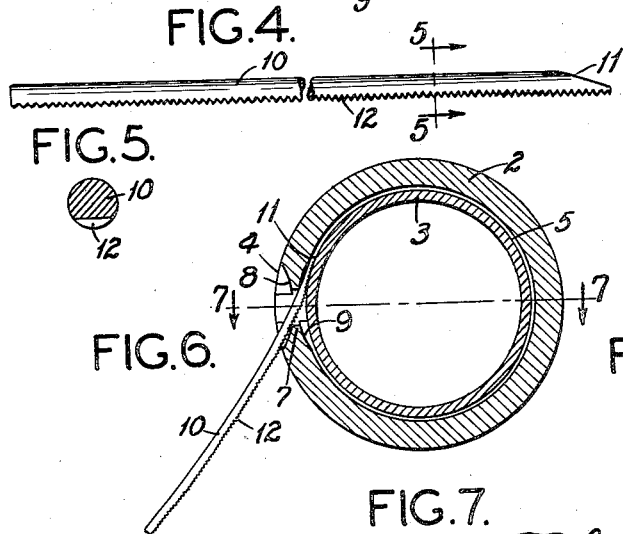
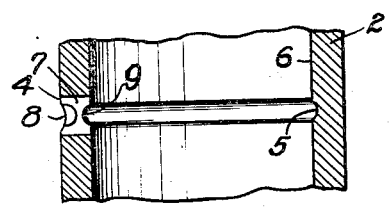
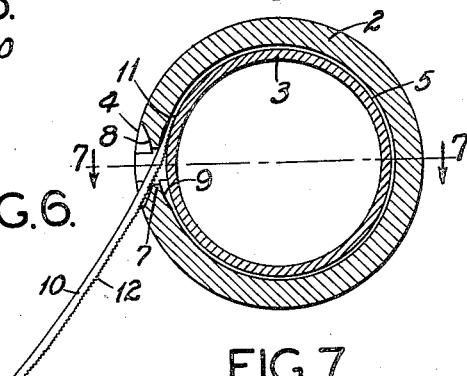
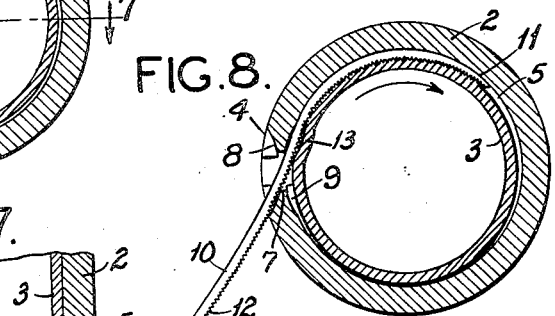
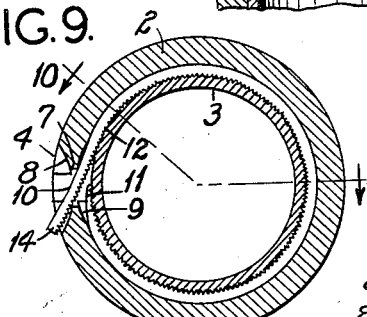
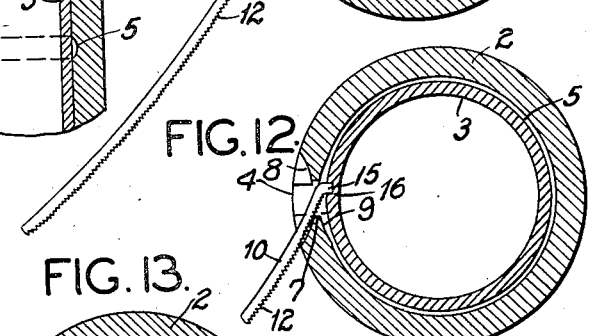
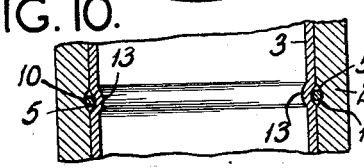
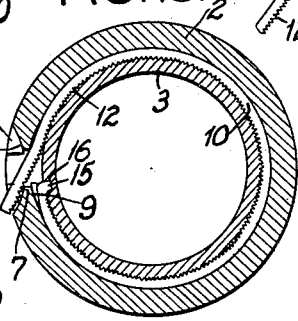
Francis Jordan Wilson, Inventor,
Delos F. Haynes, Attorney.

Patented Apr. 28, 1936

2,038,867

UNITED STATES PATENT OFFICE 2,038,867

JOINT

Francis Jordan Wilson, Port Huron, Mich., assignor to Mueller Brass Co., Port Huron, Mich., a corporation of Michigan Application August 19, 1935, Serial No. 36,773

5 Claims. (Cl. 285—117)

This invention relates to joints and fittings, and with regard to certain more specific features, to joints and fittings for connecting together lengths of pipe and the like.

Among the several objects of the invention may be noted the provision of a pipe or like fitting which is adapted to produce an improved locked joint between the pipe and fitting; the provision of a fitting of the class described which, in addition to providing a locked joint, is adapted for the effectuation of a securely sealed joint; the provision of a fitting of the class described which may be assembled into a joint with minimum effort and maximum speed and facility; and the provision of a fitting of the class described which is relatively simple and economical to manufacture. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which are illustrated several of various possible embodiments of the invention, Fig. 1 is a side elevation of a T-fitting embodying the present invention, showing a pipe inserted and a joint made therewith;

Fig. 2 is a cross section of the fitting of Fig. 1 taken substantially along line 9—9 but omitting the pipe shown in Fig. 1;

Fig. 3 is an axial section taken substantially along line 3—3 of Fig. 2;

Fig. 4 is an enlarged side elevation of a locking member;

Fig. 5 is an enlarged cross section of the locking member, taken substantially along line 5—5 of Fig. 4;

Fig. 6 is a view similar to Fig. 2, illustrating the initial positioning of the locking member;

Fig. 7 is an axial section taken substantially along line 7—7 of Fig. 6;

Fig. 8 is a view similar to Fig. 6, showing a subsequent stage in the application of the locking member;

Fig. 9 is a view similar to Figs. 6 and 8, showing the ultimate positioning of the locking member, and comprising an accurate section taken substantially along line 9—9 of Fig. 1;

Fig. 10 is an axial section taken along line 10—10 of Fig. 9;

Fig. 11 is a fragmentary view, similar to Fig. 4, showing an alternative form of locking member;

Fig. 12 is a sectional view similar to Fig. 6, showing the use of the alternative locking member of Fig. 11; and Fig. 13 is a section similar to Fig. 9, illustrating the final positioning of the alternate locking element shown in Fig. 11.

Similar reference characters indicate corresponding parts throughout the several views of the drawing.

Referring now more particularly to Fig. 1, numeral 1 indicates a pipe fitting, which, for purpose of illustration, has been shown as a T. The T has been chosen for exemplary purposes only, and it is to be understood that the invention applies with equal facility to all classes of pipe fittings, as L's, couplings, crosses, nipples, adapters, caps, valve ends, and the like, the sole criterion being that the fitting must have a socket portion 2 which is adapted to telescopingly receive the length of pipe or the like which it is desired to connect thereto. The T-fitting illustrated, in accordance with its shape, has three such socket portions 2.

Basically, the fitting 1 is of the general type shown in Gresley et al. Patent Number 1,776,502, dated September 23, 1930. That is, it is a relatively heavy, non-deformable fitting designed particularly for use with unthreaded, relatively thin-walled deformable pipe, which is usually made of copper. Such a pipe, for example, is indicated at numeral 3. In accordance with the teaching of the said Gresley et al. patent, the joint effected with this fitting is made by telescoping the pipe 3 into one of the sockets 2, and thereafter introducing liquid solder or like sealing material through a sprue or feed-hole 4 into an internal groove 5 (see Fig. 2), whence it is fed by capillary attraction to the interface region between the pipe and fitting. It will be understood that the receiving portion of the socket 2 and the pipe 3 are so dimensioned that the clearance therebetween is of suitable size to induce such capillary flow of the liquid solder.

The present invention provides new means, in addition to the solder film described, whereby the pipe 3 is securely locked into the fitting 1.

Referring now more particularly to Fig. 2, numeral 6 indicates the inner smooth, cylindrical wall of the socket portion 2. Numeral 5, as has been intimated, indicates an interior annular groove which is formed on the inner wall 6 intermediate its ends. Numeral 4, as has likewise been intimated, indicates a sprue or solder feed hole. The sprue 4 is of a special construction in the present invention. It comprises a cylindrical portion 7 which is first drilled into the side of the fitting, an exterior arcuate slot or indentation 8, and a similar interior slot or indentation 9. The indentations 8 and 9 are desirably made in the fitting by the application of a suitable milling wheel indicated by dotted lines at numeral 20, both inside and outside of fitting. The width of the slots 8 and 9, as indicated in Fig. 1, is desirably less than the diameter of the cylindrical portion 7 of the hole 4. The purpose of this particular shape for the hole 4 will be more apparent hereinafter.

If either the slot 8 or the slot 9 is made relatively larger than the size shown, then the other slot may sometimes be dispensed with.

Referring now to Fig. 4, numeral 10 indicates a length of wire which is usually of circular cross section. The circular cross section is not essential to the present invention, but it has been found to operate advantageously with the curved cross section of the groove 5 indicated in Fig. 3. The length of the wire 10 is preferably slightly over the circumferential length of the groove 5, for purposes which will be made apparent hereinafter. At one end of the wire 10 there is provided a tapered portion 11 (see Fig. 4). Along the entire length of the wire 10, on the side thereof opposite the tapered portion 11, there are provided corrugations or serrations 12. The serrations 12 are desirably sufficiently sharp so that they are able to bite into the metal of the pipe 3, as will be pointed out hereinafter. The shape of the serrations 12 is indicated in Fig. 5, which is an enlarged cross-sectional view of the wire 10.

It is preferable, both from the standpoint of ease of manufacture, and from the standpoint of more readily securing a good joint, that the serrations 12 extend the entire length of the wire 10. However, under certain circumstances this is not altogether necessary, and a short region of corrugations or serrations need only be provided near the tapered end 11.

The wire 10 constitutes the locking member of the present invention. Its application is indicated in Figures 6 through 10 inclusive. Referring to Fig. 6, it will be seen that the pipe 3 is now shown as inserted into socket 2 of the fitting 1. The tapered end 11 of the wire 10 is now inserted through the opening 4 in such manner that it is tangential to the pipe 3 and the serrations 12 engage the side of the pipe 3. The slots 8 and 9, in connection with the hole 4, permit such tangential insertion of the wire 10. The wire 10, it will be understood, is of lesser diameter than the thickness of the slots 8 and 9, so that it slides freely therethrough. This relation of diameters is indicated in Fig. 7.

If the pipe 3 is now manually grasped, exteriorly of the fitting, and turned in the clockwise manner indicated in Fig. 8, it will be seen that the serrations 12 bite into the walls of said pipe, thereby dragging or pulling along the wire 10. The wire 10 is desirably made of a harder material than the pipe 3. For example, if the pipe 3 is copper, the wire 10 may be brass, steel, iron, or the like. Because of this relative difference in hardness, and because the diameter of the wire 10 is greater than the region provided for it by the depth of the groove 5, a groove 13 (see also Fig. 10) is forced into the pipe 3 as it is turned. When the pipe has made one complete revolution, to the position illustrated in Fig. 9, the groove 13 will extend completely therearound. Because of the thin-walled character of the pipe 3, the groove 13 has a counterpart bead on the interior of the pipe 3. The wire 10 is now almost entirely within the fitting, and lying between oppositely facing grooves 5 in the fitting and 13 in the pipe. Because of the tight fit afforded, the pipe is thus securely locked in the fitting.

As heretofore intimated, the length of the wire 10 is desirably somewhat greater than the circumference of the groove 5 and hence of the pipe 3. This means that when the position of Fig. 9 has been achieved, a short length of the wire 10, indicated by numeral 14, is left extending through the hole 4. This end 14, visible from the exterior of the fitting, forms a signal or sign that the completed joint is a locked one. If no such signal is desired, the length of the wire 10 may be made such that it is entirely drawn within the fitting in the course of rotating the pipe, thus leaving no end 14 exposed.

When the wire 10 has thus been entirely drawn into the fitting and the position in Fig. 9 achieved, liquid solder or similar sealing material may be fed in through the opening 4 to seal the joint. From Figures 1 and 10, it will be seen that the wire 10 does not completely fill either the opening 4 or the groove 5; hence, the liquid solder may be introduced into the fitting and may travel around the fitting through the groove 5, to spread by capillary attraction into the interface region in the same manner as set forth in the said Gresley et al. patent. By the addition of said sealing material, the joint is made tight or is sealed, in addition to being locked.

A combination locked and sealed joint, such as that just described, is particularly useful, for example, in fire sprinkler installations where it is essential that the installation remain in position even though the temperature becomes sufficiently high to melt out the solder. With a joint as thus described, even if the solder or sealing material melts and runs out of the joint, a locked joint which is relatively tightly sealed is still maintained, and the pipe does not come out of the fitting. In many other circumstances, such a type of joint is desirable.

Fig. 11 illustrates a form of locking wire 10 which may be used in alternative manner to that shown in Fig. 4. In the Fig. 11 embodiment the tapered end 11 is dispensed with, while the analogous end of the wire 10 is bent down to form a short hook or ear or projection 15. In using this form of locking wire, a shallow hole 16 is drilled into the side of the pipe 3 (see Fig. 12) after the pipe is in position in the fitting, the drilling being preferably done through the hole 4. The end 15 of the wire 10 is then hooked into the hole 16, and the pipe 3 turned as in the previous embodiment. The engagement of the end 15 in the hole 16 causes the wire 10 to be pulled into the joint and its final position is as illustrated in Fig. 13.

The taper 11 and the hooked end 15 thus both comprise means on the end of the wire 10 whereby it is attached to the pipe 3.

With the Fig. 11 embodiment, the serrations 12 are not as important as they are with the Fig. 4 embodiment, for the engagement between the end 14 and the hole 15 is usually sufficient to draw the entire length of the wire 10 into the fitting in making the joint. However, the serrations 12 when provided in the Fig. 11 embodiment, have an additive holding effect and are advantageously, though not necessarily, provided.

The locking wires of Figures 4 and 11 are separately described and claimed in my copending application, Ser. No. 69,891, filed March 20, 1936.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

I claim:

1. A joint comprising a fitting having a socket, a thin-walled metallic entering member telescopingly received in said socket, said socket having a preformed interior encircling groove, a locking member in said groove and engaging the entering member in such manner as to form an oppositely faced groove therein, with a bead on the interior of the entering member, and a film of solidified sealing material occupying the interfacial region between said socket and said entering member.

2. A joint comprising a fitting having a socket, a thin-walled metallic entering member telescopingly received in said socket, said socket having a preformed interior annular groove intermediate the ends thereof, a wire locking member in said groove and engaging the entering member in such manner as to form an oppositely faced annular groove therein, with an annular bead on the interior of the entering member, and a film of solidified sealing material occupying the interfacial region between said socket and said entering member.

3. A joint comprising a fitting having a socket, a thin-walled metallic entering member telescopingly received in said socket, said socket having a preformed interior encircling groove and an opening in said socket communicating with said groove, a wire locking member in said groove and engaging the entering member in such manner as to form an oppositely faced groove therein, with a bead on the interior of the entering member, said locking member having an end projecting through said opening to the exterior of the socket affording a signal that the joint is locked, and a film of solidified sealing material occupying the interfacial region between said socket and said entering member.

4. A joint comprising a fitting having a socket, a thin-walled metallic entering member telescopingly received in said socket, said socket having a preformed interior encircling groove, and an opening in said socket communicating with said groove, said opening having slotted portions associated therewith at an angle thereto, a locking member introduced tangentially into said groove through the slotted portions of said opening and engaging the entering member in such manner as to form an oppositely faced groove therein, with a bead on the interior of the entering member, and a film of solidified sealing material occupying the interfacial region between said socket and said entering member.

5. A joint comprising a relatively non-deformable metallic fitting having a socket, a thin-walled relatively deformable metallic entering member telescopingly received in said socket, said socket having a preformed interior encircling groove, a relatively hard locking member in said groove and engaging the entering member in such manner as to form an oppositely faced groove therein, with a bead on the interior of the entering member, and a film of solidified sealing material occupying the interfacial region between said socket and said entering member.

FRANCIS JORDAN WILSON.